United States Patent
Strongin et al.

(10) Patent No.: US 7,146,477 B1
(45) Date of Patent: Dec. 5, 2006

(54) MECHANISM FOR SELECTIVELY BLOCKING PERIPHERAL DEVICE ACCESSES TO SYSTEM MEMORY

(75) Inventors: Geoffrey S. Strongin, Austin, TX (US); David S. Christie, Austin, TX (US); William A. Hughes, San Jose, CA (US); Kevin J. McGrath, Los Gatos, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 215 days.

(21) Appl. No.: 10/419,090

(22) Filed: Apr. 18, 2003

(51) Int. Cl.
*G06F 12/00* (2006.01)

(52) U.S. Cl. ...................... 711/163; 709/229

(58) Field of Classification Search ............... 711/163; 709/229
See application file for complete search history.

(56) References Cited

U.S. PATENT DOCUMENTS

| | | | | |
|---|---|---|---|---|
| 4,521,853 | A * | 6/1985 | Guttag | 711/163 |
| 4,630,197 | A * | 12/1986 | Khera | 711/163 |
| 5,442,704 | A * | 8/1995 | Holtey | 711/163 |
| 5,729,716 | A * | 3/1998 | Lee et al. | 711/163 |
| 5,732,245 | A * | 3/1998 | Lee et al. | 711/163 |
| 5,987,604 | A | 11/1999 | Edrich | |
| 6,327,652 | B1 | 12/2001 | England et al. | |
| 6,330,670 | B1 | 12/2001 | England et al. | |
| 6,499,092 | B1 * | 12/2002 | Harwood et al. | 711/163 |
| 6,505,279 | B1 * | 1/2003 | Phillips et al. | 711/163 |
| 6,854,039 | B1 * | 2/2005 | Strongin et al. | 711/163 |
| 6,854,046 | B1 | 2/2005 | Evans et al. | |
| 2001/0020254 | A1 * | 9/2001 | Blumenau et al. | 709/229 |
| 2002/0002673 | A1 | 1/2002 | Narin | |
| 2003/0200402 | A1 | 10/2003 | Willman et al. | |
| 2003/0200405 | A1 * | 10/2003 | Willman et al. | 711/163 |
| 2004/0205203 | A1 * | 10/2004 | Peinado et al. | 709/229 |

FOREIGN PATENT DOCUMENTS

EP 1 209 563 A2 11/2001

OTHER PUBLICATIONS

"Microsoft Scheme for PC Security Faces Flak", Merritt, *EE Times*, Issue 1227, Jul. 15, 2002.
U.S. Appl. No. 10/419,084.
U.S. Appl. No. 10/429,132.
U.S. Appl. No. 10/654,734.
U.S. Appl. No. 10/419,085.
U.S. Appl. No. 10/419,086.
U.S. Appl. No. 10/419,084.
U.S. Appl. No. 10/419,038.
U.S. Appl. No. 10/419,083.
U.S. Appl. No. 10/419,121.
U.S. Appl. No. 10/419,091.
U.S. Appl. No. 10/419,122.
U.S. Appl. No. 10/419,120.

* cited by examiner

*Primary Examiner*—Pierre Bataille
*Assistant Examiner*—Sheng-Jen Tsai
(74) *Attorney, Agent, or Firm*—Meyertons Hood Kivlin Kowert & Goetzel, P.C.; B. Noël Kivlin; Stephen J. Curran

(57) ABSTRACT

A system is configured to selectively block peripheral accesses to system memory. The system includes a secure execution mode (SEM)-capable processor configured to operate in a trusted execution mode. The system also includes a system memory including a plurality of addressable locations. The system further includes a memory controller that may determine a source of an access request to one or more of the plurality of locations of the system memory. The memory controller may further allow the access request to proceed in response to determining that the source of the access request is the SEM-capable processor.

21 Claims, 5 Drawing Sheets

MECHANISM FOR SELECTIVELY BLOCKING PERIPHERAL DEVICE ACCESSES TO SYSTEM MEMORY

This application claims the benefit of U.S. Provisional Application No. 60/373,571 filed Apr. 18, 2002.

BACKGROUND OF THE INVENTION

1. Field of the Invention

This invention relates to computer systems employing secure execution mode-capable processors and, more particularly, to selectively blocking accesses to system memory originating from sources other than the secure execution mode-capable processor.

2. Description of the Related Art

Modern computer systems are revolutionizing the way people live. This is particularly true for system platforms including microprocessors employing the x86 system architecture. The openness of x86-based systems to a myriad of owner-installable third-party peripheral devices and applications has enabled a broad marketplace of hardware and software vendors that has fostered competition, innovation, and evolution. An example of such evolution is the now widespread use of the platform as a digital communication and media system of ever-increasing quality and capability. In concert with the Internet, these system platforms are clearly revolutionizing mass distribution of digital content, allowing on-demand access to newspapers, real-time weather conditions and radio stations from around the world, on-line banking and shopping, and audio and video-based entertainment.

Since the x86 platform is an open architecture, devices typically have vendor-supplied drivers which run in Kernel mode in order to access the devices, and certain software applications may include Kernel mode components. Thus, although the open architecture may have advantages and may still provide a large degree of protection against accidental interference of one application with another, the current architectural protection mechanisms may be exposed in this environment to unwanted manipulation.

Computer systems including microprocessors employing the x86 architecture include features designed to protect against applications interfering with each other. For example, x86-based operating systems rely on two features of the x86 Protected mode architecture to provide an environment where applications are isolated from each other, and critical operating system code and data is isolated from applications: 1) paged virtual memory, and 2) execution privilege level.

Paged virtual memory allows the Operating System (OS) to define a separate virtual address space for each application, and to selectively map individual pages of physical memory into each of those virtual address spaces through a set of address translation tables. This provides each application with its own private section of physical memory for code and data that may be inaccessible to other applications. The virtual memory mechanism may also allow the OS to selectively map pages of physical memory into multiple virtual address spaces, and to selectively designate such pages in virtual space as read-only. This shared mapping capability may also allow a copy of the OS Kernel itself to reside in each application's address space, and may likewise allow shared mappings of peripheral device access ports and associated device driver routines, thus providing applications with efficient access to OS services without requiring costly address space switches. But the OS portion of the address space necessarily includes system data areas that OS code must be able to modify, and which must still be protected from application code. The read-only designation may not provide proper protection for such areas.

The x86 architecture also defines four privilege levels, 0 through 3, which are assigned to regions of code by the OS and kept in code segment descriptors. Typically, the privilege level of currently executing code or procedure will be stored as the Current Privilege Level (CPL). Thus the privilege levels are commonly referred to as CPL0 through CPL3. Using these privilege levels, certain system resources are accessible only to code executing at the proper level. The paged virtual memory architecture may allow access to pages of virtual memory to be restricted by privilege level. Although four privilege levels are defined, only the CPL0 and CPL3 levels are typically used by mainstream operating systems because the paged virtual memory architecture does not distinguish CPL1 or CPL2 from CPL3. CPL0 is commonly referred to as Kernel mode and is the most privileged level, while CPL3 is commonly referred to as User mode and is the least privileged level. OS code and data are typically assigned to CPL0 while application code and data are assigned to CPL3. CPL0 execution privilege does not override read-only protection; the two attributes are independent. Code segment descriptors are used to assign these levels.

In addition to this memory protection, all processor control registers, including those that control virtual memory operation, are by architectural definition accessible only at CPL0. In addition, special control transfer instructions are typically required to switch execution from one segment to another, and hence to switch privilege levels. These instructions allow the OS to limit the targets of such control transfers to specific entry points in OS-controlled code, hence an application may not change privilege level without simultaneously handing control over to the OS.

The isolation of address spaces from each other, and of OS memory from applications, may be completely controlled by the contents of the virtual memory address translation tables. The translation tables define the virtual-to-physical page mappings that isolate one application's memory from another's, and also the read-only and privilege level attributes that protect shared libraries and the OS. The tables themselves are memory-resident data structures, and contain translation entries that map them into the shared OS memory area and restrict access to them to Kernel mode code.

The existing protection mechanisms would seem to provide adequate protection for applications and the operating system. In a well-behaved system, (e.g. correct application of these mechanisms by the operating system, and correct operation of the OS code that controls these mechanisms, and that all other code which runs in Kernel mode does not interfere with this) they do. However, typical x86-based systems include such a large amount of Kernel-mode code, not just from the OS vendors but from many independent sources, that it may be impossible for anyone to assure that such interference, whether accidental or otherwise cannot occur. Further, it is possible that peripheral devices that access system memory directly, bypassing the virtual memory protection mechanisms, may compromise sensitive system data.

Depending on the type of operation that a user is performing and the type of software application that is running, information stored within or running on the computer system may be vulnerable to outside access. Thus, it may be desirable to improve security and thereby possibly make x86 architecture systems less vulnerable to such access.

SUMMARY OF THE INVENTION

Various embodiments of a system configured to selectively block peripheral accesses to system memory are disclosed. In one embodiment, the system includes a secure execution mode (SEM)-capable processor configured to operate in a trusted execution mode and a system memory including a plurality of addressable locations. The system also includes a memory controller coupled between the SEM-capable processor and the system memory. The memory controller may determine a source of an access request to one or more of the plurality of locations of the system memory, and may further allow the access request to proceed in response to determining that the source of the access request is the SEM-capable processor.

In one specific implementation, one or more of the plurality of addressable locations of the system memory may be protected. Further, the memory controller may prevent the access request to protected addressable locations from proceeding in response to determining that the source of the access request is not the SEM-capable processor.

Figure 1:
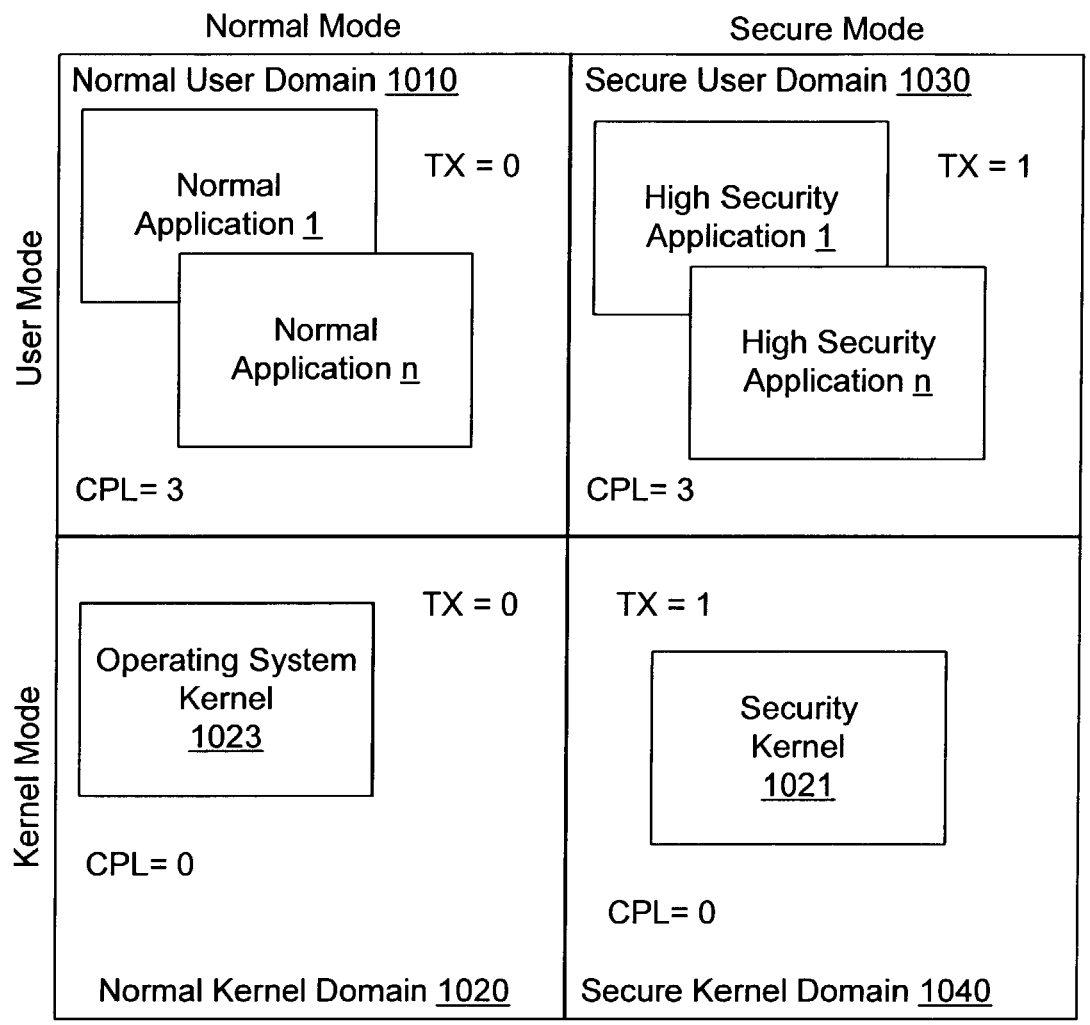
FIG. 1 is a diagram illustrating the operational domains of one embodiment of a secure execution mode-capable processor and the behavior of code operating in those domains.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Overview of a Secure Computing Platform

Trusted computing enables computer system (e.g., personal computer (PC)) users to participate in new activities such as downloading electronic cash and movies while at the same time being protected from attacks on their privacy. To be part of a trusted computing environment, the PC itself must be trusted by both the user and outside entities such as banks and content providers, for example. Critical elements which may be necessary to create a trusted PC include: a trusted processing environment, platform-specific secrets, cryptographic processing, secure storage and a secure operating system code segment referred to as a Security Kernel (SK). The building blocks to implement these elements will be described in greater detail below.

Processors configured to execute x86 instructions generally include architectural features such as Protected mode, which provides for paged virtual memory and privileged execution modes, and the set of control registers which controls these features. Controlling access to those control registers and page tables may provide additional protection from unauthorized access to program code and data within a computer system. Thus, adding a set of architectural extensions to such processors and corresponding software support may provide this protection. The overall security enhancements to a processor may be referred to as a Secure Execution Mode (SEM). Secure Execution Mode (SEM) is a new operating mode added to a processor that creates a trusted execution environment in which a Security Kernel can run free from external tampering.

Accordingly, a processor capable of operating in SEM may include security hardware which, when enabled by SEM, provides support for SEM operating modes such as a trusted execution (TX) mode of operation, for example. As will be described further below, the trusted execution mode may include, depending on what software is executing and its privilege level, the SEM-capable processor operating in a secure user mode and a secure kernel mode in addition to the normal user mode and normal kernel mode. Mechanisms may also be provided to create a protected memory region that may only be accessible by software running within this environment and to prevent certain hardware memory accesses (e.g., direct memory access (DMA)).

The new Trusted Execution environment (TX) is somewhat analogous to the traditional normal/protected mode (CPL3/CPL0) mechanism used to separate User and Kernel environments. As described in greater detail below in conjunction with the description of FIG. 1, the combination of User/Kernel modes with trusted/non-trusted modes creates a four-quadrant model. Thus, an SEM-capable CPU contains the hardware mechanisms that create and enforce the TX mode.

Turning now to FIG. 1, a diagram illustrating the operational domains of one embodiment of a secure execution mode-capable processor and the behavior of code operating in those domains is shown. As described above, current x86-based operating systems typically use two of the four available privilege levels (e.g., CPL0 and CPL3) to implement two modes within a normal execution mode or protection domain: Normal Kernel Mode and Normal User Mode. The SEM enhancements, when SEM is enabled, define a new execution mode which is referred to as trusted execution (TX) mode. When combined with the existing normal execution mode protection domains, TX mode creates the four distinct modes or software operational domains described below. In the illustrated embodiment, the four domains are normal user (NU) domain 1010, normal kernel (NK) domain 1020, secure user (SU) domain 1030 and secure kernel (SK) domain 1040.

The NU 1010 domain may be characterized by a processor running in normal user mode (i.e. CPL=3) and not in trusted execution (TX) mode. In the NU 1010 domain, typical virtual memory settings allow for normal operation of unmodified applications. Under SEM, such applications are however prevented from accessing the memory of applications residing in the SU domain 1030, or the memory containing Security Kernel 1021 in the SK domain 1040. Further, such applications are prevented from accessing the memory of the OS Kernel 1023 or device drivers in the Normal Kernel domain 1020 by existing protection logic mechanisms such as U/S and R/W page attributes for example (not shown).

In the NK domain 1020, SEM allows for normal operation of unmodified OS Kernel 1023 components and kernel-mode device drivers. Code executing in this domain may access objects in the NU domain 1010, but is prevented under SEM from accessing objects in either the SU domain 1030 or the SK domain 1040. Further, the NK domain 1020 may be characterized by a processor running in Normal Kernel mode (i.e. CPL=0) but not in TX mode. When paging is enabled in the NK domain 1020, a processor may sometimes be referred to as operating in a Native kernel mode.

In the SU domain 1040, SEM may allow a new type of application software such as high security application (HSA) 1, for example to run. HSA software may be prevented from accessing objects in any other domain by existing x86 page protection and page mapping mechanisms. In addition, the HSAs are protected from unauthorized access by any code executing in the NU domain 1010 and the NK domain 1020, including the operating system kernel 1023 and device drivers (not shown in FIG. 2). As will be described in greater detail below, Security Kernel 1021 may be responsible for setting up and maintaining the virtual address spaces of HSAs. Further, the SU domain 1040 may be characterized by a processor running in User mode (i.e. CPL=3) but also in TX mode, which may also be referred to as a secure user mode.

In the SK domain 1040, SEM may allow Security Kernel 1021 full access to all platform resources and in addition may give exclusive control of those resources to Security Kernel 1021. The SK domain 1040 may be characterized by a processor running in Kernel mode (i.e. CPL=0) and also in TX mode, which may also be referred to as a secure kernel mode.

Generally speaking, Security Kernel 1021 is software which runs in the trusted execution (TX) mode. In one embodiment, Security Kernel 1021 may be the only software that runs in SK domain 1040. In SK domain 1040, security kernel 1021 may control all virtual-to-physical memory mappings, and may control what areas of physical memory are accessible to external devices. However, Security Kernel 1021 may rely on the OS kernel's process creation functions, including normal mode virtual memory mappings, initial mapping of HSA memory and loading of HSA code and data sections. Security Kernel 1021 may however monitor every such mapping to ensure that there is no unauthorized mapping of trusted memory into untrusted virtual spaces. Thus, Security Kernel 1021 may regard all areas of memory that are not trusted as untrusted. Further, Security Kernel 1021 may regard all running program code that is not controlled by Security Kernel 1021 to be untrusted. It is noted that in one embodiment, Security Kernel 1021 may be a stand-alone code segment which may be a patch to an existing OS. In alternative embodiments, Security Kernel 1021 may be a module or code segment within and part of a given OS.

Major functions of SEM include placing the system in the trusted environment by initializing the processor to run in SEM, verifying the authenticity of the SK, and protecting the trusted environment from outside attacks. It is noted that the terms CPU, microprocessor and processor may be used interchangeably. Thus, one of the main features of SEM is that SEM protections may be reliably enabled after the system is up and running. In one embodiment, there may be no requirement to change the typical x86 platform boot process. SEM protections may typically be turned on by a system software component that, for the purposes of this document, is referred to as an SEM driver (not shown). The SEM driver may be independent from the OS kernel, but run in kernel mode, much like any device driver. As will be described in greater detail below in conjunction with the descriptions of FIG. 2 through FIG. 5, a key to reliably establishing SEM protections from within the unprotected system environment of the typical x86 platform is a new mechanism referred to as a DMA Exclusion Vector (DEV), which is intended to protect the trusted environment from outside attacks during the initialization and subsequent operation of the SK.

Central to creating a trusted PC is a unique, platform specific, secret. In practice, this secret may be the private half of a public/private cryptographic key pair. The secret must only be used when the PC is operating within the trusted environment, and it must never be revealed to anyone—or any code. The results of cryptographic operations using the secret can be revealed, but not the secret itself. For this to work, the secret and the cryptographic processing machinery that uses it must exist in a closed box with controlled inputs and outputs. In practical terms, a closed box refers to a single integrated circuit (IC) package that combines processing capability and nonvolatile storage. This device is referred to as a Security Services Processor (SSP). In one embodiment, at least one SSP is required and exactly one SSP participates in the platform initialization process.

Architecturally, the SSP may be located anywhere in the platform. The only requirement is that a non-spoofable and secure communication path exist between the SEM-capable processor and the SSP. As used herein, a non-spoofable communication path between the SEM-capable processor and the SSP refers to a secure communication path in which the SSP does not receive commands from either software executing outside of the trusted environment or from DMA hardware. This may be especially complicated when the trusted environment is being initialized. Here, the SSP must verify the validity of the SK and be certain that the SK that is being validated is actually the code running at that instant on the SEM-capable processor. The validation takes the form of a cryptographic hash of the SK image. This hash must be delivered to the SSP in a manner that could not have resulted from the operation of normal software. Further, the SEM-capable processor must begin execution of the SK from a clean initialization state (and the SSP must know this). These requirements may be met by using CPU microcode and hardware mechanisms that are unavailable to normal software. A specific feature of the SEM-capable processor, the Security Kernel Initialization (SKINIT) instruction, is used to perform various security initialization functions such as reinitializing the SEM-capable processor, verifying that other processors in an MP system are stopped, and communicating with the SSP using reserved system addresses and unique bus transactions and jumping into the SK code, for example. It is noted that in one embodiment, the SKNIT instruction is a single instruction having multiple microcode components that execute atomically. As used herein, to execute atomically refers to executing to completion in a specified order without interruption. It is further noted that in one embodiment, the initialization process includes two steps: the validation of a small Secure Loader (SL) by the SSP, followed by the validation of the much larger SK.

Computer Systems Employing A Trusted Computing Platform

Figure 2:
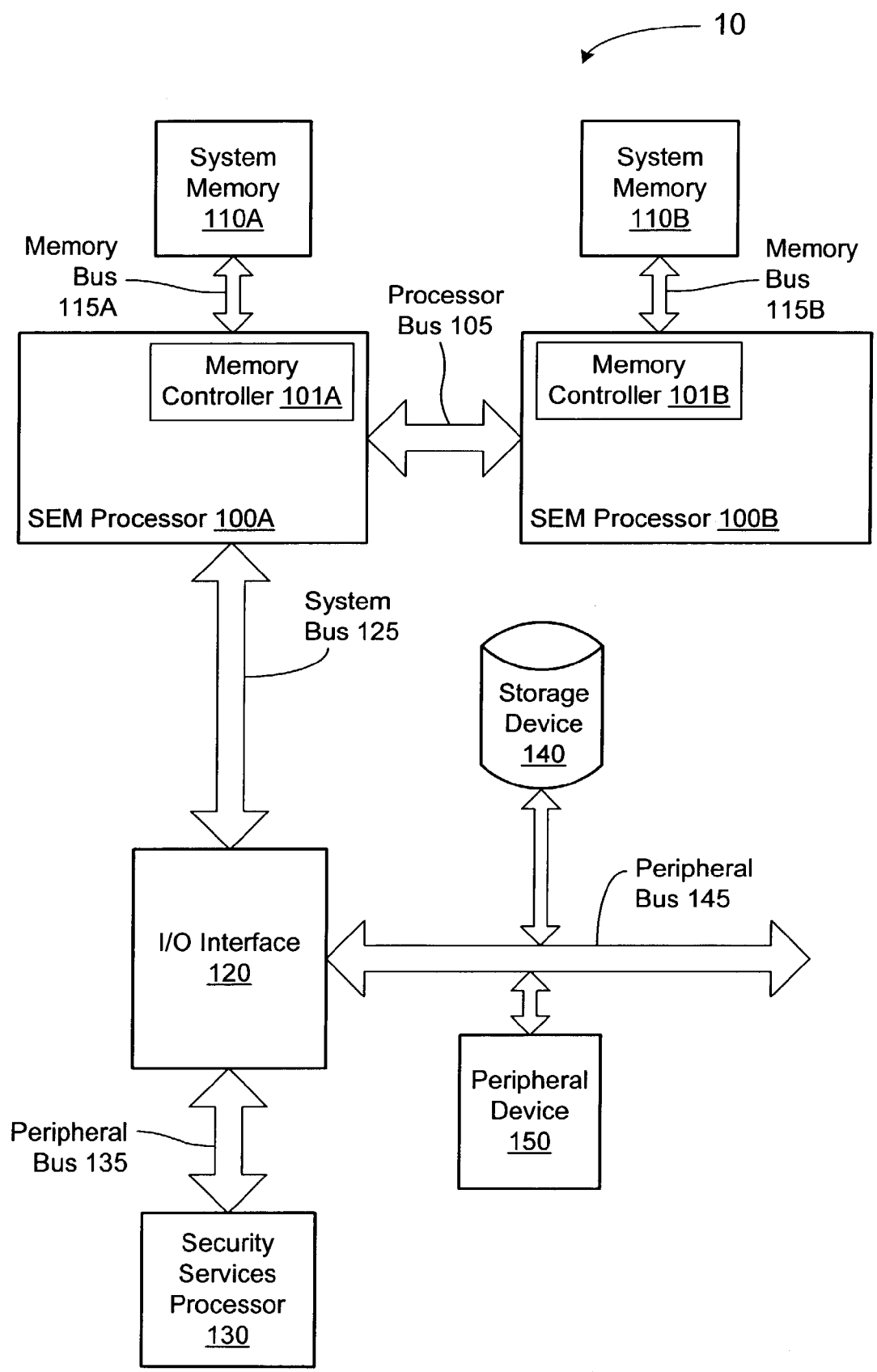
FIG. 2 is a block diagram of one embodiment of a computer system employing a trusted computing platform.

Referring to FIG. 2, a block diagram of one embodiment of a computer system employing a trusted computing platform is shown. Computer system 10 includes two SEM capable processors designated SEM processor 100A and SEM processor 100B. SEM processor 100A is coupled to SEM processor 100B via a processor bus 105. Computer system 10 also includes a system memory 110A which is coupled to SEM processor 100A and a system memory 110B which is coupled to SEM processor 100B. SEM processor 100A is coupled to an I/O interface 120 via a system bus 125. It is noted that in alternative embodiments, system memories 110 may be connected to I/O interface 120. I/O interface 120 is coupled to a storage device 140 and to a peripheral device 150 via a peripheral bus 145. I/O interface 120 is further coupled to SSP 130 via peripheral bus 135. In an alternative embodiment, instead of peripheral bus 135, SSP 130 may be coupled to peripheral bus 145. It is noted that although two SEM processors are shown, other embodiments may include other numbers of SEM processors. It is also noted that components having the same reference number and a letter may be referred simply to by the reference number alone. For example, SEM processor 100A may be referred to simply as SEM processor 100 where appropriate.

SEM processor 100 is illustrative of a processor employing the x86 architecture. For example, in one embodiment, SEM processor 100 may be an Athlon™ processor by Advanced Micro Devices, Inc. As such, SEM processor 100 is configured to execute x86 instructions which may be stored in system memory 110 or storage device 140. In the illustrated embodiment, SEM processor 100 may include security hardware (not shown in FIG. 2) that, when enabled by SEM, provides support for SEM operating modes such as the trusted execution (TX) mode described above in conjunction with the description of FIG. 1, for example.

In the illustrated embodiment, SEM processor 100A and SEM processor 100B each include an integrated memory controller designated memory controller 101A and 101B, each manufactured on the same integrated circuit as its respective SEM processor 100A and 100B. It is noted that in other embodiments, memory controller 101 may be manufactured on a separate integrated circuit and coupled to SEM processor 100 as a north bridge. As will be described in greater detail below, memory controller 101 includes security hardware (not shown in FIG. 2) that, during SK initialization, may protect from unauthorized access a range of addresses of system memory 110 used to store the SL image, and during SK operation, may protect from unauthorized access selected addresses of system memory 110. The security hardware may also be configured to route transactions associated with the SKINIT instruction to I/O interface 120.

System memory 10 is configured to store program instructions and data that is frequently used by SEM processor 100. In a typical system configuration, storage device 140 may be used to more permanently store the program instructions and data and as SEM processor 100 needs the data and program code, it may be transferred to system memory 110. Additional support for SEM operating modes may be provided by the security kernel which may be executed in conjunction with the OS out of system memory 110 during operation of SEM processor 100. In addition, system memory 110 may be partitioned into a trusted portion and an untrusted portion. The security kernel resides in the trusted portion of system memory 10. As described above, system memory 10 is typically accessed using paged virtual memory. In such an arrangement, physical addresses in system memory 10 may be accessed by individual pages or chunks of memory. This paging function is typically handled by OS memory management functions.

In one embodiment, system memory 110 may be implemented using a plurality of memory chips implemented in dynamic random access memory (DRAM) technology or in one of the varieties of DRAM technologies available, such as synchronous DRAM (SDRAM), for example. The DRAM chips are typically mounted on small circuit boards having an edge connector which are inserted into a socket connector on a motherboard. Depending on the configuration of the boards, they may be referred to as either single or dual in-line memory modules (e.g. SIMMs or DIMMs, respectively). System memory 110 may include multiple banks of memory modules which may allow memory expansion.

As described above, storage device 140 may store program code and data. In one embodiment, storage device 140 may be a hard disk drive or a bank of hard disk drives, although other embodiments are contemplated that include other mass storage devices such as CD-ROM drives, floppy disk drives and tape drives, for example.

Peripheral device 150 may be any peripheral device such as a modem, video capture device or other general purpose input output device, for example. It is noted that in other embodiments, other numbers of peripheral devices may be used.

I/O interface 120 may be configured to provide bus control and translation for transactions between different peripheral buses and SEM processors 100A and 100B during normal system operation. In one embodiment, I/O interface 120 may perform functions associated with a Northbridge. For example, peripheral bus 145 may be a peripheral component interconnect (PCI) bus and peripheral bus 135 may be a low pin count (LPC) bus. In addition, I/O interface 120 may be configured to determine whether an SSP is connected to it and to which bus and to allow non-spoofable communication to occur between SEM processor 100 and SSP 130 during a secure initialization. I/O interface 120 may also be configured to recognize SKINIT related messages and transport those messages to SSP 130 in the specific format of peripheral bus 135.

Direct Memory Access (DMA) Exclusion

For performance reasons, computer systems such as computer system 10 generally provide for I/O devices such as storage device 140 or peripheral device 150 to write directly into system memory without intervention by the processor. This is commonly referred to as Direct Memory Access (DMA) or bus mastering. Generally speaking, if a large quantity of data is being read into system memory 110 from storage device 140, DMA enables storage device 140 to initiate the data transfer directly into system memory 110, thereby freeing SEM processor 100 to do other tasks while the data transfer proceeds. However, the DMA mechanism may present a security risk in a secure system by providing a path through which sensitive data in trusted system memory may be read or altered by malicious software applications. In one embodiment, malicious DMA transfers could corrupt the Secure Loader during SK initialization, or could corrupt page tables or other trusted data structures during SK operation.

Figure 3:
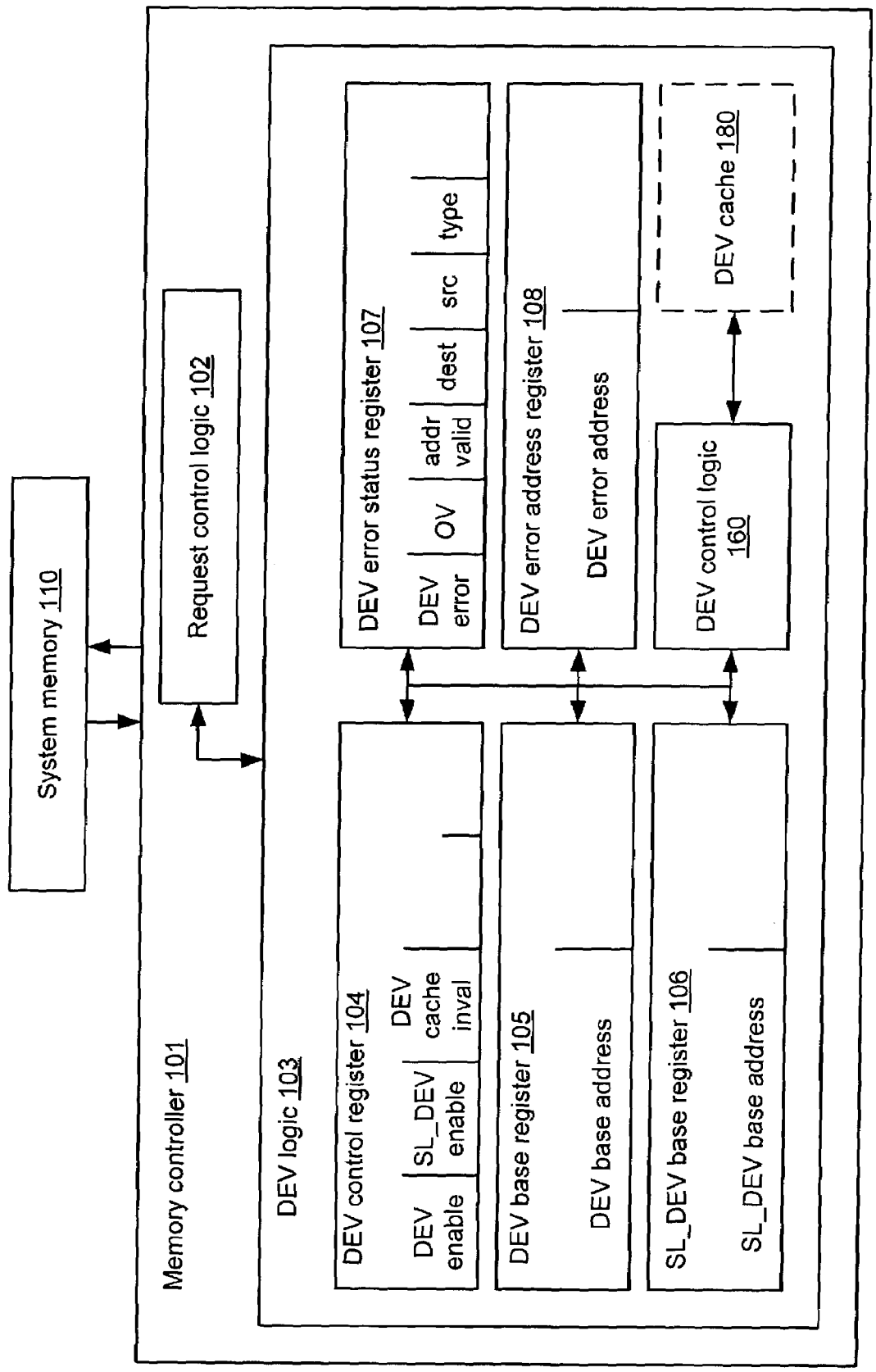
FIG. 3 is a block diagram illustrating one embodiment of a memory controller.

Turning to FIG. 3, a block diagram of one embodiment of memory controller 101 is shown. Memory controller 101 includes request control logic 102 coupled to DEV logic 103. DEV logic 103 includes DEV control logic 160 coupled to an optional DEV cache 180. DEV control logic 160 is also coupled to several control registers including DEV control register 104, DEV base register 105, SL_DEV base register 106, DEV error status register 107, and DEV error address register 108.

Request control logic 102 may be configured to receive access requests for system memory 110 from SEM processor 100 or from I/O interface 120 via a system request interface (not shown). As used herein, access request refers to any request by any device to read from or write to one or more locations in system memory, and it is noted that the terms access request, memory access request, and system memory access request may be used interchangeably. Request control logic 102 may be configured to determine the source of an access request, distinguishing between access requests originating from SEM processor 100 and access requests originating from any other source. In the illustrated embodiment, request control logic 102 may be configured to allow access requests originating from SEM processor 100 to access system memory 110, and to refer all other access requests to DEV logic 103.

As will be described in greater detail below, a DMA exclusion vector (DEV) may be used to selectively disable DMA transfers, to prevent malicious software from using such transfers to compromise system security. In one embodiment, the DEV is a contiguous array of bits in system memory 110 that is referenced by memory controller 101 during operation of SEM processor 100, as described further below. Each bit may correspond to a single 4 KB page of the physical system memory address space, also referred to herein as a physical memory page or physical page. The first bit in the array corresponds to the first 4 KB page in physical memory, the second bit to the next page and so on. In this embodiment, the bits cover a total of 4 GB of physical address space, thus occupying 128 KB of contiguous physical memory (32 4 KB pages). However, in other embodiments, it is contemplated that the DEV may use different page sizes and may cover a larger or smaller physical address space, and may thus include other numbers of corresponding bits in the array. Additionally, in other embodiments it is contemplated that the DEV may include a number of bits covering a subset of the physical pages in the physical address space.

In one embodiment, if a bit in the DEV is asserted, the physical page of system memory 110 associated with that bit may be protected against unauthorized DMA transfers. Such a physical page is referred to herein as a protected page, and addressable locations within system memory 110 corresponding to a protected page are referred to herein as protected locations. External bus-master or DMA device cycles may be inhibited from reading or writing protected locations. In one embodiment, read accesses to such protected locations of system memory 10 may return all 1's and write accesses may terminate without affecting the memory contents. The physical pages of system memory 110 that contain the DEV should be protected by the DEV itself. It is noted that in other embodiments, the protected locations corresponding to the DEV may be organized in other than uniform physical pages.

In one embodiment, the DEV contents may be initialized and maintained by the SK. However, in such an embodiment, the SK may be vulnerable to unauthorized DMA activity after it begins executing but before it initializes and enables the DEV. To further protect the system in this situation, the SKINIT instruction may specify the physical base address of a particular region of memory. As will be described further below, when the SKINIT instruction begins executing, the specified region of memory will be protected against unauthorized DMA access. In one embodiment, the SL will be loaded into the protected region of memory and will execute solely out of this region of memory until the DEV contents are initialized and enabled.

In one embodiment, the region of memory protected by the SKINIT instruction is a fixed 64 KB in length commencing from the specified physical address. It is noted however that in other embodiments a different region size may be used.

When an unauthorized DMA transfer request to or from a region of system memory 110 protected by the DEV is detected, a DEV error may occur. In response to the DEV error, information corresponding to the unauthorized DMA transfer request may be logged. As will be described further below, in one embodiment the system memory address corresponding to the unauthorized request as well as information about the request's source, destination, and the type of request may be logged for further analysis by the SK. In other embodiments, other information corresponding to an unauthorized access request may be logged for use by other applications.

It is noted that although in one embodiment, the DEV has been described as a mechanism for protecting trusted memory from unauthorized DMA access in an SEM-capable microprocessor-based system, in other embodiments the DEV may also serve to protect non-trusted memory contents. In one alternative embodiment, the OS may request that the SK protect non-trusted OS code and data from stray DMA device accesses, thereby increasing the robustness of the system against error. In another alternative embodiment, DEV protections may be set up and controlled directly by the OS if the SEM features of the processor are not enabled. In yet another alternative embodiment, a non-SEM-capable processor may implement only the DEV mechanism to be set up and controlled by the OS.

DEV logic 103 may be configured to receive access requests from request control logic 102. In the illustrated embodiment, DEV control logic 160 may be configured to operate in conjunction with the control registers described below to retrieve the DEV bit associated with the physical page of the destination address of a given access request. In one embodiment, DEV control logic 160 retrieves the DEV bit by issuing additional access requests to request control logic 102 to load the appropriate DEV bit from system memory 110. In another embodiment, a subset of the DEV corresponding to frequently or recently accessed system memory addresses may be cached in DEV cache 180 to reduce the number of additional system memory access requests required to access the DEV, thereby increasing system performance. In yet another embodiment, the entire DEV may be stored in DEV cache 180, thereby eliminating the need to generate additional system memory access requests to access the DEV.

DEV control register 104 may contain control information relevant to the operation of DEV control logic 160. In the illustrated embodiment, DEV control register 104 includes control bits designated "DEV enable," "SL_DEV enable," and "DEV cache inval." The "DEV enable" bit may control whether DEV access protection is enabled or disabled. In the illustrated embodiment, when the "DEV enable" bit is asserted, DEV protection is enabled; when the "DEV enable" bit is deasserted, DEV protection is disabled. The "SL_DEV enable" bit may control whether access to the region of memory beginning at the address contained in SL_DEV base register 106, described below, is protected from DMA accesses. In the illustrated embodiment, when the "SL_DEV enable" bit is asserted, the 64 KB memory region beginning at the address contained in SL_DEV base register 106 is protected from DMA accesses; when the "SL_DEV enable" bit is deasserted, protection of this region is disabled. If optional DEV cache 180 is implemented, the "DEV cache inval" bit may cause DEV cache 180 to be invalidated, forcing subsequent DEV references to access system memory 110. In the illustrated embodiment, when the "DEV cache inval" bit is asserted, DEV control logic 160 invalidates DEV cache 180; once invalidation is complete, DEV control logic 160 deasserts the "DEV cache inval" bit. In other embodiments, it is contemplated that DEV control register 104 may include other bits having additional functionality; these bits are not shown for simplicity.

DEV base register 105 may contain information corresponding to the location of the DEV structure in system memory. In the illustrated embodiment, DEV base register 105 includes the address of the beginning of the DEV structure in system memory 110, also referred to as the DEV base address. DEV control logic 160 may use the DEV base address to calculate the location in the DEV structure of a particular bit corresponding to the physical page of the destination address of a given access request. In other embodiments, it is contemplated that DEV base register 105 may include other bits having additional functionality; these bits are not shown for simplicity.

SL_DEV base register 106 may contain information corresponding to the location of the region of system memory protected by the SKINIT instruction. In the illustrated embodiment, SL_DEV base register 106 includes the address of the beginning of the 64 KB region of memory to be protected from DMA accesses during execution of the SL, also referred to as the SL_DEV base address. DEV control logic 160 may use the SL_DEV base address to determine whether the destination address of a given access request falls within the protected region. In other embodiments, it is contemplated that SL_DEV base register 106 may include other bits having additional functionality; these bits are not shown for simplicity.

When an access request originating other than from SEM processor 100 is attempted to a physical page in system memory 110 that is protected by the DEV, a DEV error may occur. DEV error status register 107 may contain information corresponding to the status of DEV errors. In the illustrated embodiment, DEV error status register 107 includes bits designated "DEV error," "OV," and "addr valid," and bit fields designated "dest," "src," and "type." The "DEV error" bit may indicate that a memory access request originating from a source other than SEM processor 100 has attempted to access a DEV protected area of memory. In the illustrated embodiment, when the "DEV error" bit is asserted, a DEV error has occurred. When a DEV error occurs, the contents of DEV error address register 108, described below, and all other bits except the "OV" bit in DEV error status register 107 will remain unchanged by subsequent DEV errors. When the "DEV error" bit is deasserted, a new DEV error may be logged. The "OV" bit may indicate that more than one DEV error has occurred. In the illustrated embodiment, when the "OV" bit is asserted, more than one DEV error has occurred, and only the error data from the first DEV error has been logged. The "addr valid" bit may indicate that DEV error address register 108, described below, may contain the address of the system memory access request causing the DEV error. In the illustrated embodiment, when the "addr valid" bit is asserted, DEV error address register 108 contains the address of the erroneous system memory access request. The "dest" bit field may indicate the destination of the system memory access request causing the DEV error, and may include values indicating that the destination was to DRAM, memory mapped I/O, or an undetermined destination. The "src" bit field may indicate the source of the system memory access request causing the DEV error, and may include values indicating that the source was from a CPU, an I/O device, or an undetermined source. The "type" bit field may indicate the type of the system memory access request causing the DEV error, and may include values indicating that the type was a read operation, a write operation, a read-modify-write operation, or an undetermined operation. In other embodiments, it is contemplated that DEV error status register 107 may include other bits having additional functionality; these bits are not shown for simplicity.

When a DEV error occurs, DEV error address register 108 may contain information corresponding to the system memory address that caused the DEV error. In the illustrated embodiment, DEV error status register includes the bit field designated "DEV error address." In the illustrated embodiment, when the "addr valid" bit of DEV error status register 107 is asserted, the DEV error address bit field of DEV error address register 108 may contain the destination system memory address of the access request that caused the DEV error. In other embodiments, it is contemplated that DEV error address register 108 may include other bits having additional functionality; these bits are not shown for simplicity.

Figure 4:
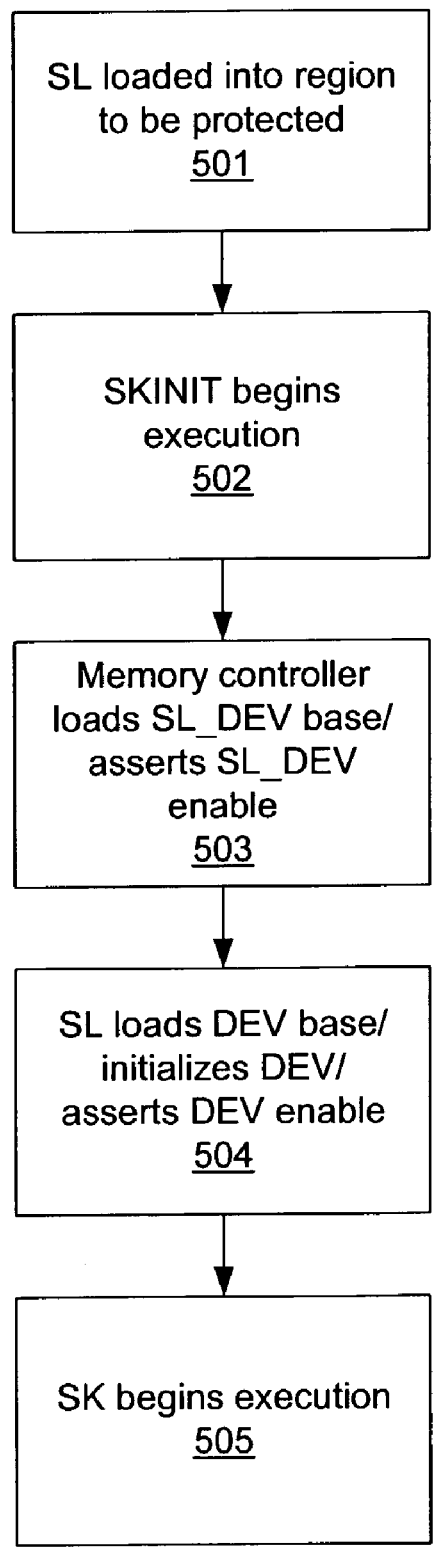
FIG. 4 is a flow diagram describing the initialization of one embodiment of a memory controller in a trusted computing platform.

FIG. 4 illustrates a flow diagram describing the initialization of one embodiment of a memory controller in a trusted computing platform. Referring collectively to FIG. 1 through FIG. 4, operation begins in block 501 where the SL is loaded into a region of memory from which it will execute. Following the loading of the SL, the SKINIT instruction begins execution (block 502). As described above, the SKINIT instruction is used to perform various security initialization functions to prepare for execution of the SK. In one embodiment, the SKINIT instruction includes the base address of the region of memory into which the SL was loaded. This region is to be protected during SL execution, and is referred to herein as the SL_DEV protected region. In response to receiving the base address of the SL_DEV protected region, memory controller 101 loads the "SL_DEV base address" field of SL_DEV base register 106 via DEV control logic 160. Once SL_DEV base register 106 has been written, DEV control logic 160 may enable protection of the specified region by asserting the "SL_DEV enable" bit in DEV control register 104 (block 503).

Once the SL_DEV protected region has been initialized and enabled, the SL may begin execution, and DEV control logic 160 may use the contents of SL_DEV base register 106 to prevent from proceeding any access requests to the SL_DEV protected region of system memory 110 that do not originate from SEM-capable processor 100. In one embodiment, the SL may load the "DEV base address" field of DEV base register with a value corresponding to the beginning location of the DEV in system memory 110. The SL may further enable protection of the locations corresponding to the DEV by asserting the "DEV enable" bit in DEV control register 104. The SL may further initialize the contents of the DEV in system memory 110 (block 504). Following initialization of the DEV by the SL, the SK may begin execution (block 505).

Figure 5:
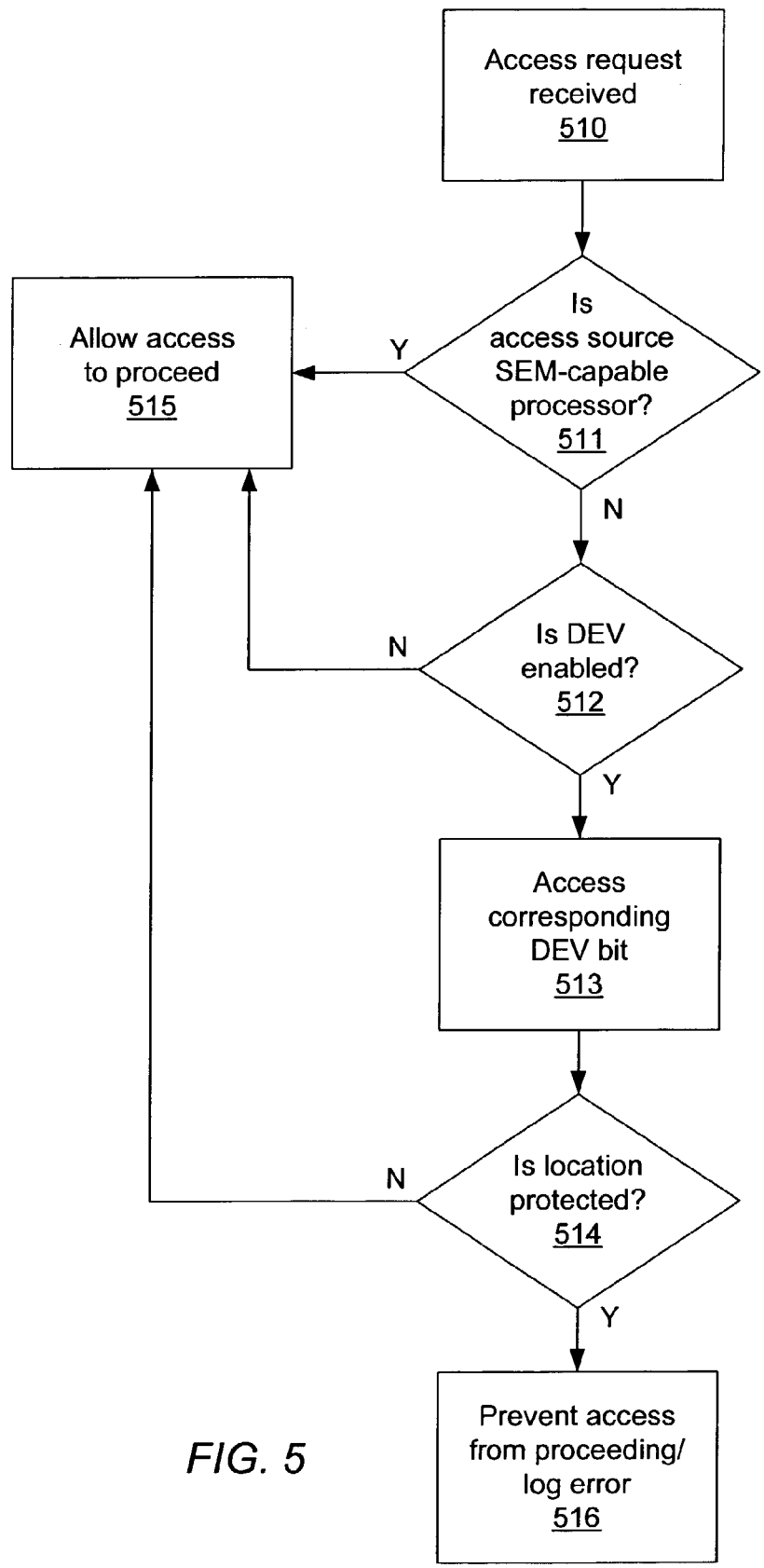
FIG. 5 is a flow diagram describing the operation of one embodiment of a memory controller in a trusted computing platform.

FIG. 5 illustrates a flow diagram describing the operation of one embodiment of a memory controller in a trusted computing platform. Referring collectively to FIG. 1, FIG. 2, FIG. 3, and FIG. 5, operation begins in block 510 where request control logic 102 receives an access request for system memory 110. In response to receiving an access request, request control logic 102 determines whether the source of the access request is SEM-capable processor 100 (block 511). If the source of the access request is determined to be SEM-capable processor 100, the access is allowed to proceed to system memory 110 (block 515).

Returning to block 511, if the source of the access request is determined to be other than SEM-capable processor 100, request control logic 102 may transfer the access request to DEV logic 103 for further processing. In the illustrated embodiment, DEV control logic 160 queries the "DEV enable" bit in DEV control register 104 to determine if the DEV is enabled (block 512). If DEV control logic 160 determines that the DEV is disabled, the access is allowed to proceed to system memory 110 (block 515).

Returning to block 512, if DEV control logic 160 determines that the DEV is enabled, DEV control logic 160 may use the contents of DEV base register 105 to access the DEV bit corresponding to the access request. If optional DEV cache 180 is implemented, DEV control logic 160 may reference it to access the corresponding DEV bit. If optional DEV cache 180 is not implemented or does not contain the corresponding DEV bit, DEV control logic 180 may load the corresponding DEV bit directly from system memory 110 (block 513).

After accessing the DEV bit corresponding to the access request, DEV control logic 160 determines whether the location corresponding to the access request is protected (block 514). If DEV control logic 160 determines that the location is not protected, the access is allowed to proceed to system memory 110 (block 515).

Returning to block 514, if DEV control logic 160 determines that the location corresponding to the access request is protected, the access is prevented from proceeding to system memory 110. In one embodiment, DEV control logic 160 may log the resulting DEV error by storing the address of the access request in the "DEV error address" field of DEV error address register 108, storing information corresponding to the destination, source, and type of the access request in the respective "dest," "src," and "type" fields of DEV error status register 107, and asserting the "addr valid" and "DEV error" bits of DEV error status register 107 (block 516).

In the foregoing discussion, the term "asserted" refers to a logic 1 value, and the term "deasserted" refers to a logic 0 value. However, in other embodiments, it is contemplated that these values may be reversed for any given bit.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   a secure execution mode (SEM)-capable processor configured to operate in a trusted execution mode;
   a system memory coupled to said SEM-capable processor, wherein said system memory includes a plurality of addressable locations; and
   a memory controller coupled between said SEM-capable processor and said system memory, wherein said memory controller includes:
      request control logic configured to determine a source of a given access request to one or more of said plurality of addressable locations of said system memory; and
      DMA exclusion vector (DEV) logic coupled to said request control logic, wherein said DEV logic is configured to allow said given access request to proceed in response to determining that said source of said given access request is an SEM-capable processor.

2. The system as recited in claim 1, wherein said one or more of said plurality of addressable locations of said system memory are protected.

3. The system as recited in claim 2, wherein said DEV logic is further configured to prevent said given access request to said protected addressable locations of said system memory from proceeding in response to determining that said source of said given access request is not said SEM-capable processor.

4. The system as recited in claim 2, wherein said plurality of addressable locations of said system memory is organized into a plurality of physical pages, and wherein said given access request includes a request to a particular one of said plurality of physical pages.

5. The system as recited in claim 4, wherein said DEV logic is further configured to reference a data structure comprising a plurality of bits, wherein each of at least a subset of said plurality of physical pages corresponds to a respective one of said plurality of bits.

6. The system as recited in claim 5, wherein said DEV logic is further configured to selectively allow said given access request to proceed dependent upon a status of said respective bit.

7. The system as recited in claim 5, wherein said data structure is located within said system memory, and wherein said data structure is cached within said DEV logic.

8. The system as recited in claim 6, wherein said memory controller further includes error status logic configured to store data pertaining to said given access request in response to determining that said given access request was not allowed to proceed.

9. The system as recited in claim 5, wherein said data structure is initialized and maintained by a secure operating system code segment.

10. The system as recited in claim 1 further comprising one or more additional SEM-capable processors.

11. The system as recited in claim 1, wherein said memory controller is manufactured on the same integrated circuit as said SEM-capable processor.

12. The system as recited in claim 1, wherein said memory controller and said SEM-capable processor are manufactured on separate integrated circuits.

13. A memory controller comprising:
   request control logic configured to determine a source of a given access request to one or more of a plurality of addressable locations of a system memory; and
   DMA exclusion vector (DEV) logic coupled to said request control logic, wherein said DEV logic is configured to allow said given access request to proceed in response to determining that said source of said given access request is an SEM-capable processor.

14. The memory controller as recited in claim 13, wherein said one or more of said plurality of addressable locations of said system memory are protected.

15. The memory controller as recited in claim 14, wherein said DEV logic is further configured to prevent said given access request to said protected addressable locations of said system memory from proceeding in response to determining that said source of said given access request is not said SEM-capable processor.

16. The memory controller as recited in claim 14, wherein said plurality of addressable locations of said system memory is organized into a plurality of physical pages, and wherein said given access request includes a request to a particular one of said plurality of physical pages.

17. The memory controller as recited in claim 16, wherein said DEV logic is further configured to reference a data structure comprising a plurality of bits, wherein each of at least a subset of said plurality of physical pages corresponds to a respective one of said plurality of bits.

18. The memory controller as recited in claim 17, wherein said DEV logic is further configured to selectively allow said given access request to proceed dependent upon a status of said respective bit.

19. The memory controller as recited in claim 17, wherein said data structure is located within said system memory, and wherein said data structure is cached within said DEV logic.

20. The memory controller as recited in claim 18, further comprising error status logic configured to store data pertaining to said given access request in response to determining that said given access request was not allowed to proceed.

21. The memory controller as recited in claim 17, wherein said data structure is initialized and maintained by a secure operating system code segment.

* * * * *